(12) United States Patent
Gschwendtner et al.

(10) Patent No.: US 8,363,101 B2
(45) Date of Patent: Jan. 29, 2013

(54) METHOD AND DEVICE FOR OPTICALLY MEASURING EXTERNAL THREADS

(75) Inventors: Hans Gschwendtner, Moers (DE); Wolfgang Hengstenberg, Krefeld (DE); Alaine Pianezzi, Famars (FR)

(73) Assignee: V&M Deutschland GmbH, Düsseldorf (DE)

(*) Notice: Subject to any disclaimer, the term of this patent is extended or adjusted under 35 U.S.C. 154(b) by 486 days.

(21) Appl. No.: 12/595,726

(22) PCT Filed: Apr. 9, 2008

(86) PCT No.: PCT/DE2008/000679
§ 371 (c)(1),
(2), (4) Date: Mar. 11, 2010

(87) PCT Pub. No.: WO2008/125102
PCT Pub. Date: Oct. 23, 2008

(65) Prior Publication Data
US 2010/0182424 A1    Jul. 22, 2010

(30) Foreign Application Priority Data

Apr. 12, 2007   (DE) ......................... 10 2007 017 747

(51) Int. Cl.
*H04N 7/18* (2006.01)
*G06K 9/00* (2006.01)
*G01B 11/00* (2006.01)
(52) U.S. Cl. ......................... 348/135; 356/398; 382/152
(58) Field of Classification Search .................. None
See application file for complete search history.

(56) References Cited

U.S. PATENT DOCUMENTS

| 4,644,394 | A | * | 2/1987 | Reeves ........................... 348/131 |
| 4,979,815 | A | | 12/1990 | Tsikos |
| 6,055,329 | A | * | 4/2000 | Mufti ............................. 382/152 |
| 2005/0011815 | A1 | * | 1/2005 | Jeh ................................. 209/576 |
| 2006/0261294 | A1 | | 11/2006 | Johnson |

FOREIGN PATENT DOCUMENTS

| DE | 103 59 837 A1 | 7/2005 |
| EP | 0913707 A | 5/1999 |
| WO | WO2005/022076 A | 3/2005 |

* cited by examiner

*Primary Examiner* — Wen-Tai Lin
(74) *Attorney, Agent, or Firm* — Henry M. Feiereisen, LLC

(57) ABSTRACT

The invention relates to a method and device for optically measuring external thread profiles, particularly at the ends of pipes, wherein the thread is previously synchronously produced in a production line and is continuously measured in line from start to finish of the thread prior to further processing. The aim of the invention is to allow cost-effective inspection of the thread during synchronous production of the thread. For this purpose, the profile of the previously produced thread is illuminated and/or scanned tangentially to the pipe cross section by means of a relative movement including rotation and translation, and by an optical measuring unit comprising a camera, and the scanning speed is adjusted such that the time for scanning the thread profile, considering the required local resolution of the camera, is within the cycle time for the production of the next thread, wherein the image of the thread contour is captured by the camera and the optical signals are then evaluated and compared to target specifications.

13 Claims, 1 Drawing Sheet

METHOD AND DEVICE FOR OPTICALLY MEASURING EXTERNAL THREADS

CROSS-REFERENCES TO RELATED APPLICATIONS

This application is the U.S. National Stage of International Application No. PCT/DE2008/000679, filed Apr. 9, 2008, which designated the United States and has been published as International Publication No. WO 2008/125102 and which claims the priority of German Patent Application, Serial No. 10 2007 017 747.1, filed Apr. 12, 2007, pursuant to 35 U.S.C. 119(a)-(d).

BACKGROUND OF THE INVENTION

The invention relates to a method and a device for optically measuring external threads, in particular pipes, according to the patent claims 1 and 4.

Pipes for example are provided with external threads for pipelines which convey especially fluids under pressure such as e.g. gas or oil. The pipes are hereby provided at their ends with an external thread and screwed together with a sleeve element having an internal thread.

In these pipelines under pressure, the demands on the screwed connections and thus the quality of the threads are high.

Such pipes are e.g. used as casings (protective pipes) and tubings (rising pipes) in oil and gas transport.

The typical outer diameter of these pipes amount to 60.3 to 177.8 mm on which threads are cut of up to 48 thread turns.

The quality check of the cut pipe threads requires a geometric measurement of the thread profiles in order to be able to compare them with the target specifications. The following values in particular are measured:

diameter of each thread turn,
  pitch of the thread per inch,
  width of the free edge between pipe end and thread beginning,
  thread length in mm,
  thread depth,
  thread contour,
  threads that were not cut through.

In the production line during cutting of the threads with a cycle time of 15 to 25 seconds for example, the quality check can be executed only with manual control of samplings.

Manual measurement of the threads is time-consuming, cost-intensive and inadequate for a comprehensive quality inspection. Moreover, there is a risk that the check of only samplings will not recognize in due time any deterioration of the thread quality so that waste and the threat of complaints increase.

DE 103 59 837 A1 discloses an optical process and an apparatus for automatic inspection of damage to threads of connecting elements, such as e.g. screws.

The apparatus includes a device for illuminating the screw being checked, with the illumination device being aligned in relation to the screw in such a way that the light beams radiate in substantial perpendicular relationship to a flank of the thread.

The apparatus further includes a collecting optical system for collecting the light beams reflected by the flank of the thread, wherein the collecting optical system is aligned in relation to the connecting element in such a manner that the substantially the light beams are captured which reflect perpendicular to the flank of the thread.

A measurement of pipe threads is, however, not possible with this apparatus as the thread profile is not detected.

SUMMARY OF THE INVENTION

It is an object of the invention to provide a method for optically measuring profiles of external threads, in particular external threads on pipes, which method is cost-efficient and allows a 100-% inspection of the thread during the cycled thread production. A further object resides in the provision of a respective apparatus.

These objects are attained according to the invention by method for optically measuring the external thread profile, in particular at pipe ends, wherein the thread is produced in a production line beforehand in a clocked manner and continuously measured prior to further processing in line from the beginning to the end of the thread, wherein the profile of the thread produced beforehand is illuminated and scanned in tangential relationship to the pipe cross section on the basis of a relative movement comprised of rotation and translation, between pipe and at least one optical measuring unit arranged in the counter light and comprised of illumination and camera, and wherein the scanning speed is set in such a manner that the time for scanning the thread profile, while taking into account the required resolution of the camera, lies within the cycle time necessary for the production of the next thread, wherein the image of the thread contour is captured by the camera, and the optical signals are evaluated thereafter and compared with target specifications.

According to the teaching of the invention, the profile of the thread produced beforehand is illuminated and scanned from the thread beginning to the thread end in tangential relationship to the pipe cross section on the basis of a relative movement, comprised of rotation and translation, between pipe and at least one measuring unit arranged in the counter light and comprised of illumination and camera.

The image of the thread contour is continuously ascertained by the camera, and the optical signals are directly evaluated thereafter and compared with the target specifications.

The scanning speed is set in accordance with the invention in such a manner that the time for scanning the thread profile, while taking into account the required resolution of the camera, lies within the cycle time necessary for the next thread production.

Exhaustive operational tests have shown that the parameters of the thread profile necessary for optical measurement of the thread can advantageously be fully determined and analyzed by the method according to the invention.

As a result of the preferably automated method, it becomes now possible to implement a 100-% thread control and thus a complete quality inspection during the thread cutting without requiring any interruption of the production course.

Any change in quality can now be directly addressed through manipulating the thread cutting process via the enabled in-line measurement. Refinishing of the thread and waste are thus minimized and the threat of complaints as a result of unrecognized flaws of the thread is significantly reduced or even eliminated.

Advantageously, CCD cameras with high resolution are advantageously used for optical detection of the thread profile and permit simultaneous evaluation of several thread turns.

According to an advantageous embodiment, the illumination is executed with telecentric light and a correspondingly configured camera with telecentric objective.

The use of telecentric components has the advantage that incident ambient light from sun light and hall light has no influence on the measuring system. With this method, the thread contour stands out with high contrast as a dark object in relation to the bright background.

The comparison of the measuring results with the pre-defined target values provides information about the thread quality.

When large pipe and thread diameters are involved, the measurement of the thread is advantageously realized with at least two cameras simultaneously on two opposite sites of the pipe because otherwise there is no way to recognize whether shifts of the profile contour in the camera images are caused by flaws in the thread or faulty positioning of the pipe in relation to the measuring unit.

As a result of the telecentric beam path, the scale factor remains constant at small positional deviations so that the measuring accuracy is not adversely affected.

Depending on the applied optics, the use of two measuring units enables a detection of the entire pipe circumference with respective thread turns during half a pipe revolution.

The performance can be enhanced in accordance with the invention through installation of further measuring units for a parallel capture and evaluation of the thread profile.

The relative movement between pipe and measuring unit can be realized in accordance with the invention in various ways in accordance with the geometric configuration of the components of the measuring unit and the thread diameter being inspected.

On one hand, just like in a continuous measurement of the thread, the pipe can be caused to rotate and the measuring unit can be moved translatorily across the thread in longitudinal pipe direction.

A further possibility involves a rotation of the measuring unit about the thread of the pipe and at the same time a translatory movement of the measuring unit in longitudinal pipe direction.

In addition, there is the possibility for continuous measurement of the thread to fix the measuring unit in place and to move the pipe under the measuring unit in a rotary and translatory manner.

A further possibility involves a fixed positioning of the pipe and a movement of the measuring unit in a rotary and translatory manner.

Before the advantageously automated series measurement of the thread profile of a certain type of pipe is used, it is necessary to set the desired parameters in a learning mode. These are predominantly the specifications for the thread and pipe parameters as well as tolerance values to be observed.

In accordance with the invention, the desired contour is either described as mathematic curve or through loading of a material pattern which is stored as image in the system to serve as reference for the series measurements. Moreover, the material pattern may advantageously serve also for calibration of the cameras.

In the event, the pipe is rotatable and the measuring unit is supported translatorily, there may be cases that the pipe inadvertently "migrates" in length direction during rotation as a consequence of supports that are not precisely aligned.

Such a change in position may cause an imprecise determination of the thread length during the measurement, and this measurement may be carried out only after the measuring unit returns to the starting position.

In order to be able to ascertain this impact on the determination of the thread length, according to with a further advantageous feature, the position of the pipe end is continuously determined in relation to the position of the measuring unit in longitudinal pipe direction and continuously calculated while taking into account a present length shift of the pipe during the measurement of the thread length so that the thread length can be determined already when the measuring unit initially departs.

Advantageously, the positional determination of the pipe end in axial direction is ascertained in accordance with the principle of laser triangulation. In this case, a CCD camera is, for example, aligned towards the pipe end at an angle of about 30° to 40° in relation to the pipe axis. Arranged in direct prolongation of the pipe or pipe axis is a line laser by which a laser line is projected onto the pipe. The camera captures the position of the laser line.

When the pipe undergoes a length shift during rotation, the laser line moves in the camera image downwards or upwards. As a result, the axial position of the pipe end can be directly determined.

The distance or change in position of the line laser in relation to the pipe, i.e. the pipe position in length direction, can be measured from the height position of the laser line in the camera image. The resolution of the measurement lies hereby in a range of about 0.5 mm.

In addition, it is advantageously detected whether a protective cap or sleeve is still placed on the pipe end. In this case, the length of the laser line increases and an alarm signal is triggered. This signal prevents that the measuring system leaves its base position and is mechanically damaged.

The positional determination according to the invention offers significant benefits:

The thread length is no longer measured during return of the travel unit as the pipe is at a standstill but directly during initial travel with all other measuring values, however then corrected by the value of an encountered length shift.

The return of the travel unit can be realized at high speed.

Further features, advantages, and details of the invention will be evident from the following description.

BRIEF DESCRIPTION OF THE DRAWING

It is shown in.

DETAILED DESCRIPTION OF PREFERRED EMBODIMENTS

Figure 1A:
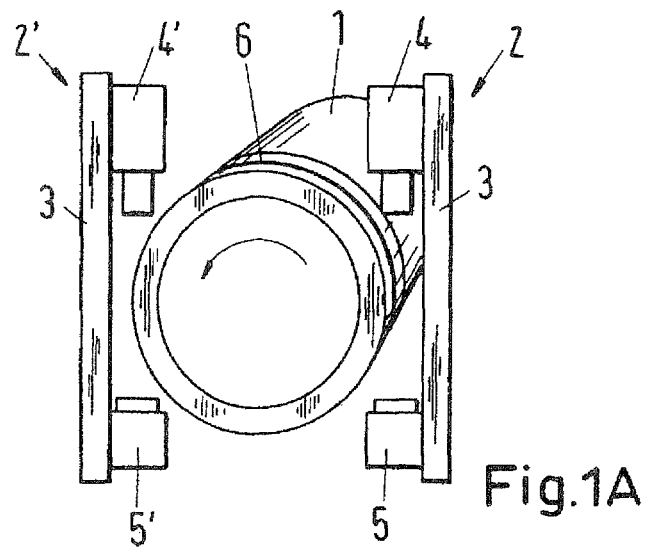
FIG. 1a a principal sketch of the apparatus according to the invention with two measuring units for optical measurement of the contour of an external pipe thread, FIG. 1b a counter light image of a thread tooth, FIG. 2 a measuring unit according to the invention for detecting the length position of the pipe during measurement.

FIG. 1a depicts a principal sketch of the apparatus according to the invention for measuring the thread contour of external threads on pipes.

To enhance the performance, i.e. shortening the measuring time, the apparatus is provided with two measuring units 2 which are arranged in opposition to one another in relation to the pipe cross section.

Each of the measuring units 2 includes a carrier 3 for attachment of an illumination 5, 5' and a camera 4, 4' which is arranged in counter light disposition in such a way that the thread 6 being measured of the pipe 1 is illuminated and scanned in tangential relationship to the pipe cross section and the image of the thread contour is captured by the camera.

In accordance with the invention, illumination 5, 5' and camera 4, 4' are configured for telecentric light.

The optical signals are then analyzed by an evaluation unit, not shown here, and thereafter compared with the target specifications to be observed.

In accordance with the invention, the relative movement, necessary for thread measurement, between pipe 1 and the measuring units 2, 2' is realized by rotating the pipe 1 and translatorily moving the measuring units 2, 2' in length direction of the pipe 1.

Using the two opposing telecentric measuring units 2, 2', the full pipe circumference is ascertained with the respective number of thread turns in dependence on the used optics of the camera 4, 4' as the pipe undergoes half a revolution. At the same time, a linear drive, not shown here, moves the measuring unit 2, 2' in length direction of the pipe 1 and the thread 6 is hereby completely measured from the beginning to the end.

During measurement, the scanning speed is adjusted in accordance with the invention in such a manner that the time for scanning of the thread profile, while taking into account the necessary resolution of the camera, lies within the production cycle time of the next thread.

Figure 1B:
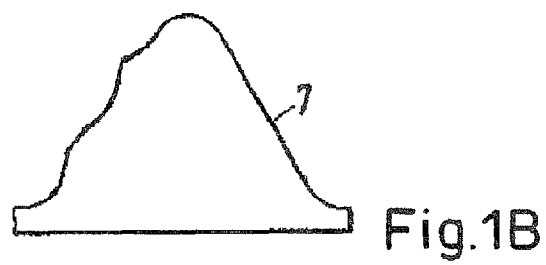

FIG. 1b shows a counter light image of the contour of a flawed thread tooth 7 during measurement. Compared to the right-hand side flank, the left-hand side flank of the thread tooth 7 shows clear deviations from the desired contour of the thread. As a result, the production process for thread cutting the subsequent thread can be directly manipulated and the flawed thread can be refinished.

Figure 2:
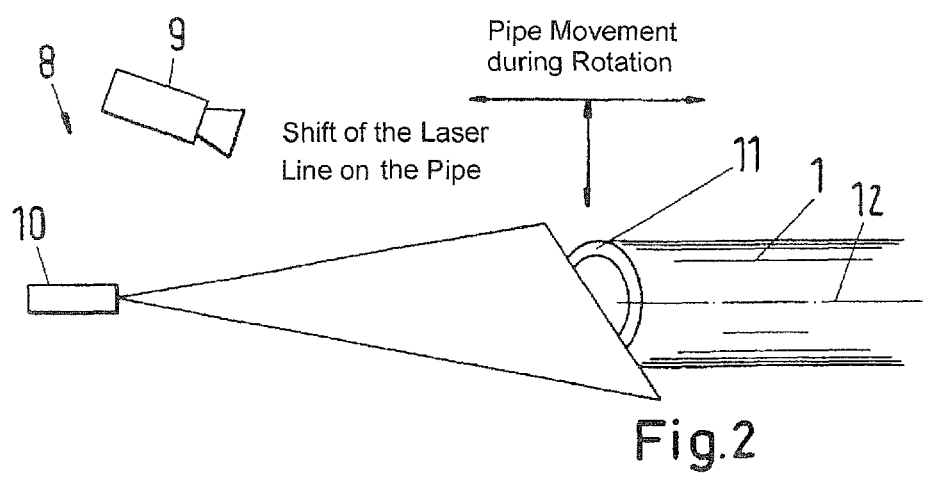

FIG. 2 shows a measuring unit according to the invention for ascertaining the length position of the pipe during measurement.

The measuring system 8 includes in accordance with the invention a line laser 10 and a camera 9. The line laser 10 is arranged at a distance to the pipe end in line with the pipe axis 12, and the camera 9 is arranged at an angle to the pipe axis 12.

The line laser 10 projects a laser line onto the pipe 1. The camera 9 captures the position of the laser line. In the event, the pipe 1 changes its length position during rotation, the laser line moves in the camera image downwards or upwards. As a result, the axial position of the pipe end can be directly determined.

The height position of the laser line in the camera image is used for determination of the distance or change in position of the line laser in relation to the pipe, i.e. the pipe position in length direction. It has been shown as beneficial to align the camera 9 onto the pipe end at an angle of about 30° to 40° in relation to the pipe axis.

The thread length ascertained by the measuring unit 2, 2' (FIG. 1a) is corrected by the value of the longitudinal shift of the pipe, and the thread length is precisely determined already during the initial travel of the measurement.

What is claimed is:

1. A method for optically measuring an external thread profile, in particular at a pipe end, comprising the steps of:
   producing a thread in a production line in a clocked manner; and
   continuously measuring the thread in line from beginning to end by
      illuminating and scanning a profile of the thread in tangential relationship to a pipe cross section on the basis of a relative movement, comprised of rotation and translation, between a pipe and at least one optical measuring unit arranged in a counter light and comprised of an illumination and a camera, wherein a position of the pipe end in relation to a position of the measuring unit is continuously determined in longitudinal pipe direction by means of laser triangulation and a thread length is calculated during measurement while taking into account possible changes in position;
      setting a scanning speed in such a manner that a time for scanning the thread profile, while taking into account a required resolution of the camera, lies within a cycle time necessary for a production of a next thread;
      capturing an image of the thread profile by the camera to generate optical signals;
      evaluating the optical signals; and
      comparing the optical signals with target specifications.

2. The method of claim 1, wherein the illuminating step is executed with telecentric light.

3. The method of claim 1, wherein at least two measuring units are used to measure simultaneously at two opposite sites in relation to the pipe cross section.

4. The method of claim 1, wherein for continuous measurement of the thread the pipe is caused to rotate and the measuring unit is moved translatorily across the thread in longitudinal pipe direction.

5. The method of claim 1, wherein for continuous measurement of the thread the measuring unit rotates about the thread of the pipe and at the same time is moved translatorily in longitudinal pipe direction.

6. The method of claim 1, wherein for continuous measurement of the thread the measuring unit is fixed in place and moved in a rotary and translatory manner.

7. An apparatus for optically measuring an external thread profile, in particular at a pipe end, said apparatus comprising:
   at least one measuring and evaluation unit comprised of an illumination and a camera;
   a carrier for attachment of the illumination and the camera in counter light arrangement in tangential relationship to a pipe cross section of a pipe, wherein the measuring unit or the pipe are supported for rotary and translatory movements relative to one another; and
   an optical measuring unit for ascertaining a length position of the pipe in relation to a position of the measuring and evaluation unit, wherein the optical measuring unit includes a line laser irradiating an end surface of the pipe end, and another camera capturing light beams reflected from the end surface of the pipe, wherein the line laser is arranged at a distance to the pipe end in line with a pipe axis, with the another camera being arranged at an angle to the pipe axis.

8. The apparatus of claim 7, wherein the illumination is a telecentric illumination and the camera is a telecentric camera.

9. The apparatus of claim 7, further comprising at least two of said measuring unit to measure in parallel, said measuring units being arranged on two opposite sites in relation to a cross section of the pipe.

10. The apparatus of claim 7, wherein the camera is a CCD camera.

11. The apparatus of claim 7, wherein the pipe is rotatably supported and the measuring unit is supported for translatory movement.

12. The apparatus of claim 7, wherein the pipe is fixed in place and the measuring unit is supported for rotary and translatory movements.

13. The apparatus of claim 7, wherein the measuring unit is fixed in place and the pipe is supported for rotary and translatory movements.

* * * * *